Patented Apr. 29, 1947

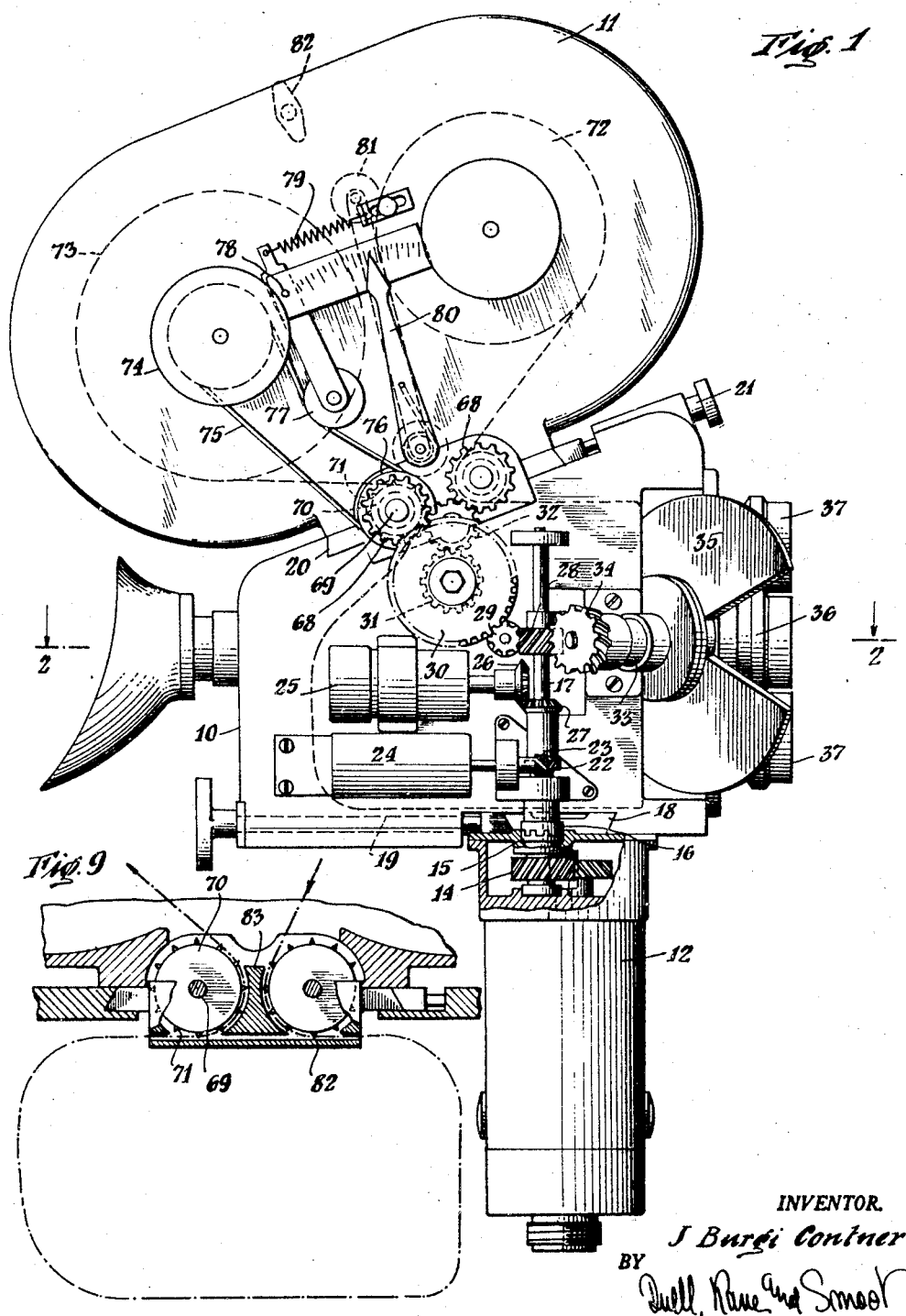

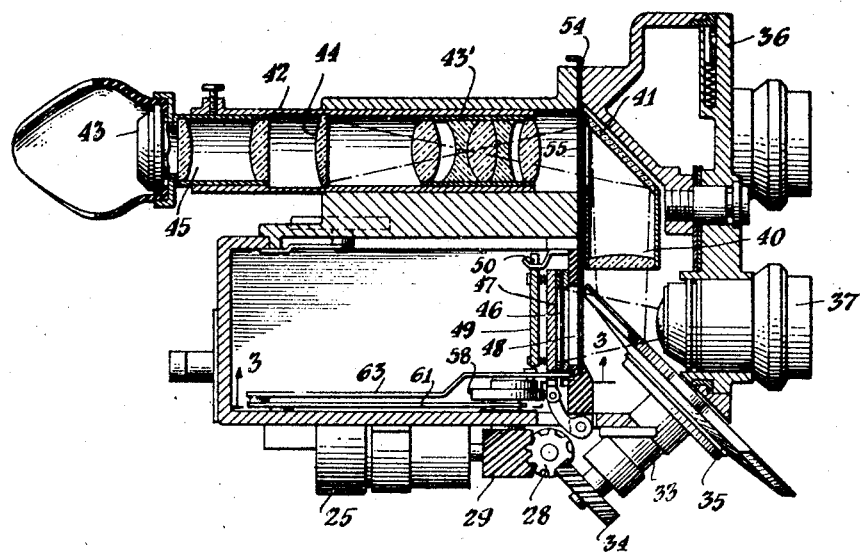
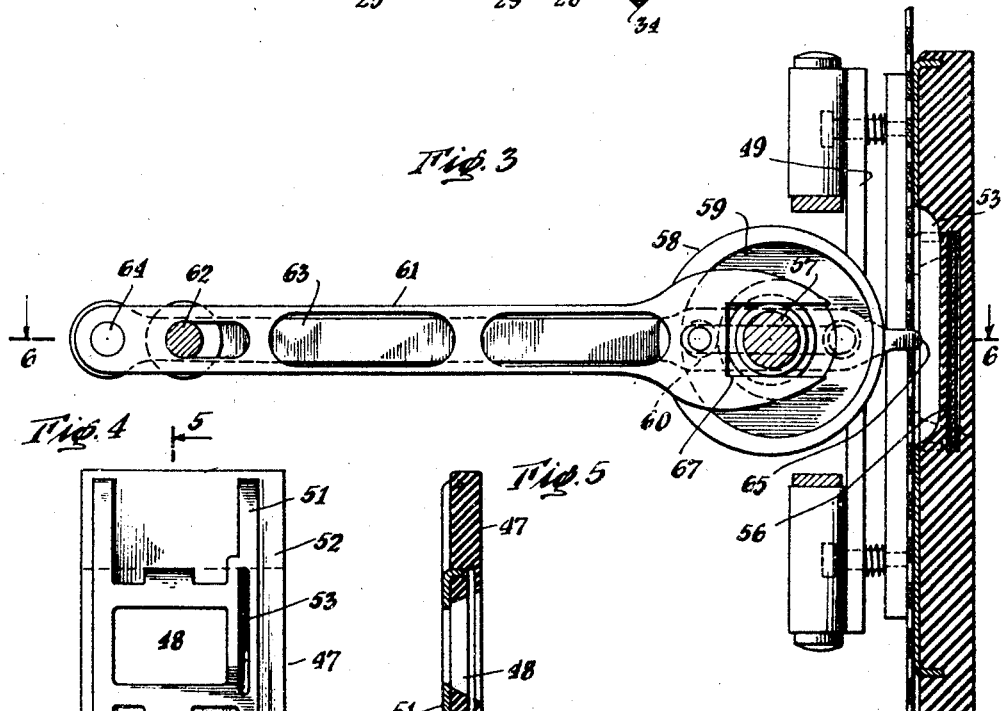
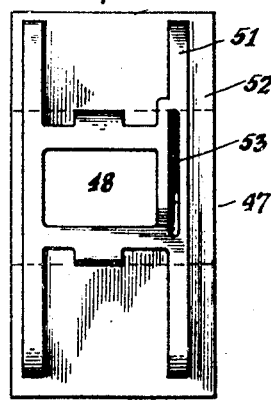
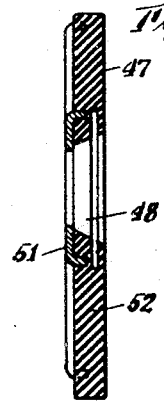

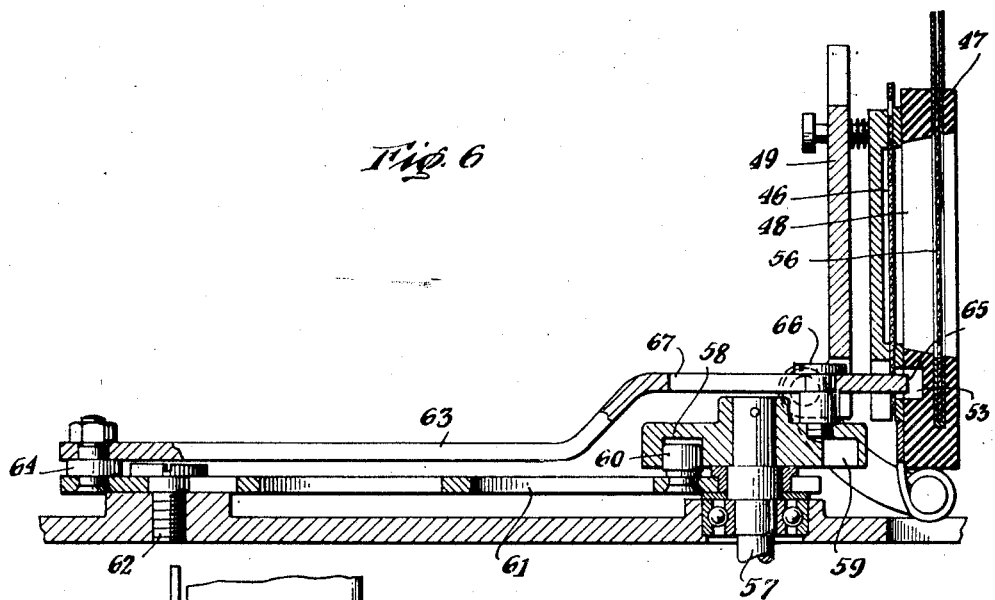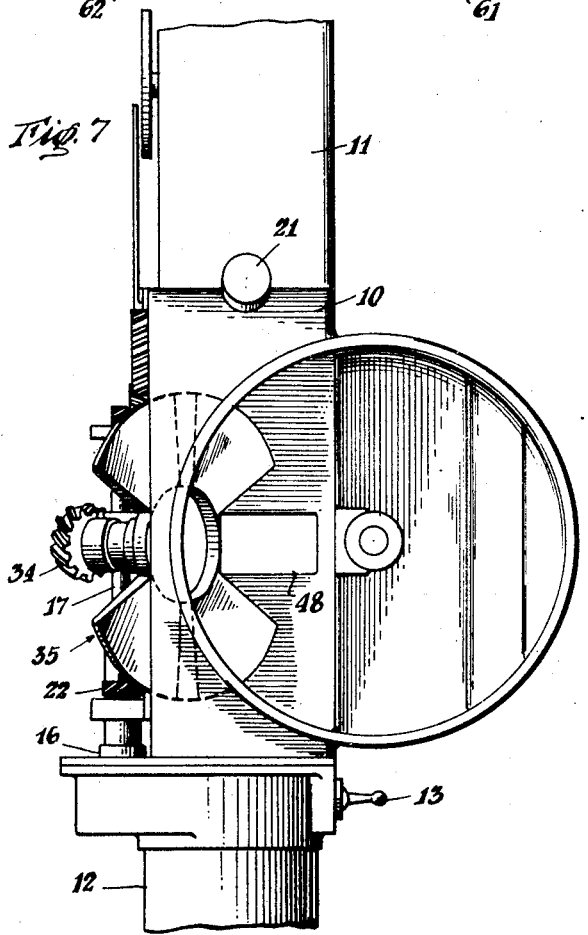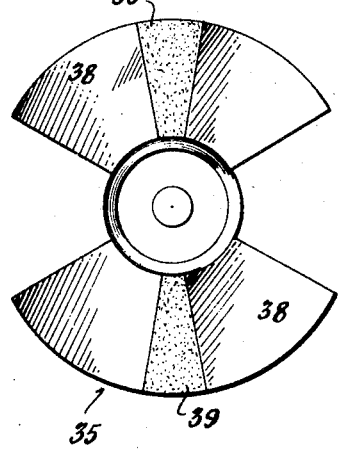

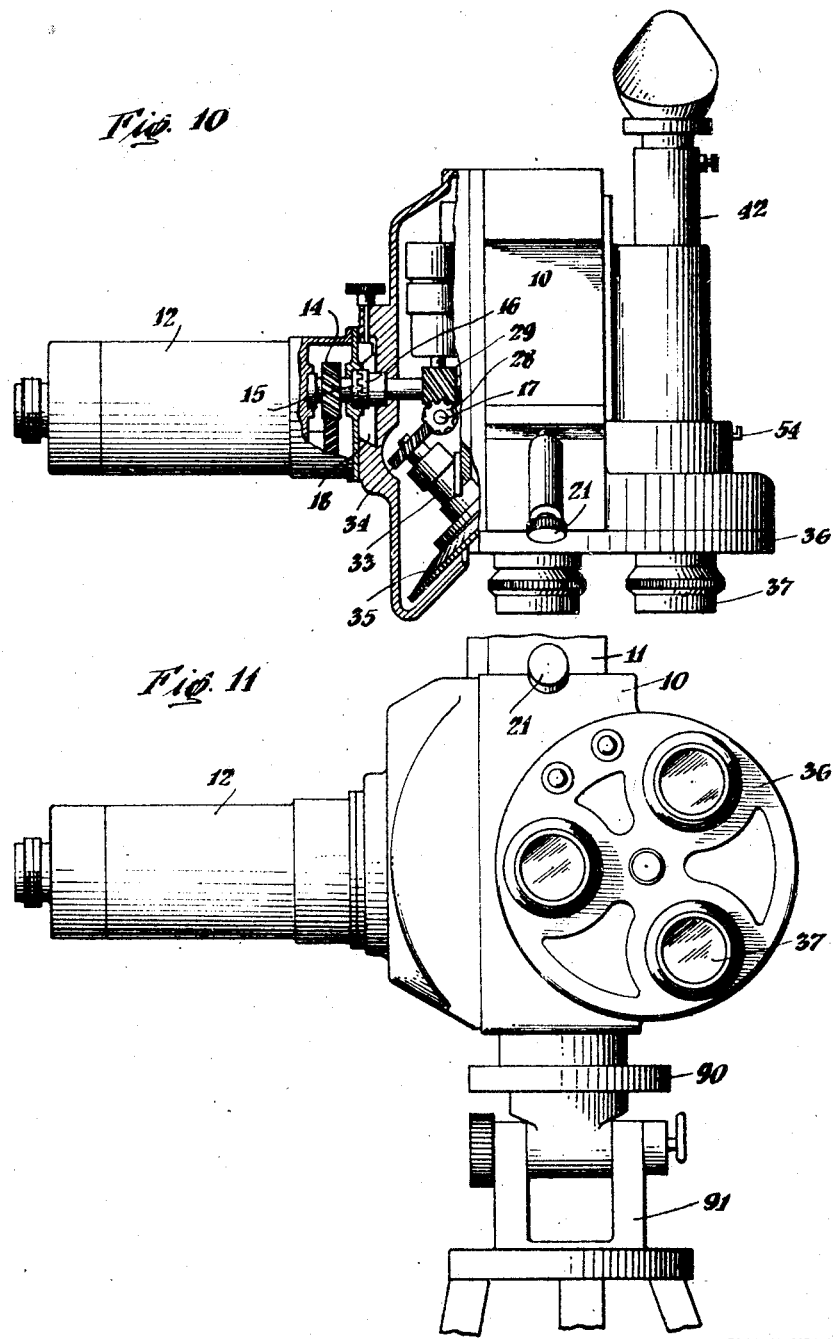

2,419,706

UNITED STATES PATENT OFFICE 2,419,706

CAMERA VIEW FINDER

J. Burgi Contner, New York, N. Y.

Application September 25, 1943, Serial No. 503,738

5 Claims. (Cl. 88—16)

1

This invention relates to a structurally and functionally improved motion picture camera.

It is an object of the invention to furnish an apparatus of this nature which will include a finder or viewing mechanism such that the operator will be able to observe a field which will be identical in area and subject matter with the exposed field appearing upon the film. In other words, a viewing mechanism will be provided which, instead of extending to one side of the lens axis, will coincide precisely with that axis and include only those light rays which are reflected back from an object, the picture of which is to be taken.

An additional object is that of providing a unit of this type and which will embody relatively few and simple parts, each of which will be relatively rugged and cooperate with the others over long periods of time with freedom from all difficulties.

With these and other objects in mind, reference is had to the attached sheets of drawings illustrating one practical embodiment of the invention, and in which:

Fig. 1 is a side elevation of a complete camera unit with certain of the covering portions removed and other parts broken away to disclose underlying constructions;

Fig. 2 is a sectional plan view taken along the lines 2—2 and in the direction of the arrows as indicated in Fig. 1;

Fig. 3 is a somewhat enlarged sectional view showing the details of the feed mechanism and gate structure;

Fig. 4 is a face view of the gate structure;

Fig. 5 is a sectional side view taken along the lines 5—5 and in the direction of the arrows as indicated in Fig. 4;

Fig. 6 is a sectional view taken along the lines 6—6 and in the direction of the arrows in Fig. 3;

Fig. 7 is a front view of the unit as shown in Fig. 1;

Fig. 8 is a face view of the shutter element;

Fig. 9 is a sectional view of a portion of the magazine;

Fig. 10 is a side elevation partly in section showing a slightly revised arrangement of the parts; and Fig. 11 is a front elevation of a camera similar to that shown in Fig. 10 but showing the same mounted on a support.

With primary reference to Fig. 1, it will be seen that the reference numeral 10 indicates the casing of the camera which mounts the magazine casing 11. Also secured to the casing 10, in a manner hereinafter brought out, may be a casing 12. This may conveniently contain an electrical motor (not shown) or any other suitable form of drive mechanism controlled, for example, by means of a switch such as 13 in Fig. 7.

The mechanism within the casing 12 serves, by means of a suitable reduction gearing 14, to drive a clutch part 15. The latter is coupled to a clutch part 16 secured to a shaft 17 rotatably mounted with respect to the casing 10. As will be obvious, the drive casing 12 may conveniently serve as a handle for the operator in supporting the entire camera assembly and a quick detachment of this part from the camera casing 10 may be effected in any desired manner, as, for example, employing a dovetail joint 18 between the two casings. In this manner, relative movements between the parts are prevented and they are normally locked against detachment as, for example, by a locking pin 19.

Similarly, the magazine casing 11 may be secured with respect to casing 10 by means of a dovetail joint structure 20 and a locking pin 21. Thus, it is obvious that the operator will normally be presented with a unitary assembly in which the parts will have no movements with respect to each other. At the same time, by merely manipulating the pins 19 or 21, the handle or motor casing 12 and the magazine 11 may readily be removed.

The shaft 17 mounts a gear 22 which serves to drive a gear 23 connected to a governor of any suitable construction, and the exterior of which has been indicated by the reference numeral 24. A tachometer, indicated by the reference numeral 25, is driven through a gear 26 coupled to a gear 27 also secured to shaft 17. Additionally, this shaft may have affixed to it a gear 28 which serves a drive the shutter, as well as a gear 29 meshing with a gear 30 which is coupled with a gear 31 to drive a gear 32. The latter gear is mounted upon and serves to provide a drive through the magazine in a manner hereinafter brought out. The shutter is actuated by the shaft 17 in that it is mounted by a shaft 33 to which is attached a gear 34 meshing with the gear 28; the shutter having been generally indicated by the reference numeral 35. Thus, it will be seen that a single unitary form of drive is furnished which will be of very simple design. Accordingly, when the motor or other driving agency is energized, the shaft 17 will rotate and, by the operation of this single unit, not alone will the magazine mechanism and the shutter be operated but also accessory elements, such as a tachometer and governor will be caused to function.

Again, as shown in Fig. 1, the forward portion of the casing 10 may mount a turret 36 to which lenses 37 are secured. This is a well known type of construction and need not be enlarged upon. Suffice it to say that at the election of the operator the head or turret may be indexed to align with the film aperture any desired lens having the proper characteristics which are, for the moment, desired.

As will be apparent in this view as well as in Figs. 2 and 7, the shutter 35 extends angularly. The degree of angularity may, of course, be varied according to the individual design of the camera. However, for general purposes, the shutter may be regarded as extending at an angle of 45° with respect to the lens axis, and the body of the shutter moves, of course, in a path interposed between the lens and the film to be exposed. With such arrangement of the parts, it is also preferred that the shaft 33 extend angularly, and so that the body of the shutter may be disposed in a plane perpendicular to the axis of this shaft. As seen especially in Fig. 8, the face of the shutter preferably includes a reflective surface or mirror 38 and the body of the shutter may be divided into two sections or wings. Also, each of the mirrored surfaces is preferably divided by a non-reflecting strip or area 39 into two surfaces; the purpose of this structure being hereinafter brought out.

In any event, as will be understood with reference to Fig. 2, if one of the wings of the shutter is disposed in line with the operative lens 37, a light image of exactly the same frame size as the photographic aperture will be reflected by the surfaces 38 which are preferably of the "front surface" type. This light image will be received on the ground glass body 40, in which it will necessarily be reversed from right to left with respect to the photographic aperture. The resultant image is reflected by the mirror 41 which, in the embodiment illustrated, is also set at an angle of 45°. Thus, the image is reflected back through the telescope assembly generally indicated at 42. The image, in addition to being reversed from right to left, as afore brought out, is now also vertically reversed, i. e., it is upside down. However, the operator, viewing the image through the eye piece 43, will have no difficulty because of the inverting lens assembly 43' which reverses the picture both from right to left as well as vertically. Additionally, a field lens 44 is provided which permits more light rays to be collected and thus to furnish a very efficient form of optical system. Finally, a magnifying lens 45 may be included in this assembly of the parts, and by means of which the size of the image will be enlarged four or five times.

A film strip 46 is disposed in line with the operative lens 37 and to the rear of the shutter 35. This strip moves adjacent to the gate generally indicated at 47 and which is formed with a framing aperture 48 to permit the light rays to pass to the film. A film-maintaining structure 49 of any desired type is disposed adjacent this point and serves to confine the movement of the film to a proper path. This unit is mounted for movement and a catch 50 may be provided for retaining it in proper position after the film has once been threaded or introduced to a point behind the aperture.

The gate as especially shown in Figs. 4 and 5 is preferably in the form of a carefully machined plate 51 conveniently formed of stainless steel. This plate is molded into a block of Bakelite or equivalent non-conducting material indicated at 52. In addition to the aperture 48 which is formed in this gate, a slot 53 is preferably provided for the accommodation of the end of the film-feeding mechanism to be hereinafter described.

As especially shown in Fig. 2, a filter may be associated with the camera. Conveniently, such association occurs at a point adjacent the gate. The filter preferably includes a strip or body 54 which may be conveniently formed of metal and introduced through a slit or opening in the side of the camera casing 10, as in Fig. 2. When so introduced, it extends across the path of the light rays traveling towards the telescope assembly 42, as well as the light rays traveling towards the framing aperture 48. In line with such paths, the body 54 is formed with opening 55 and a further opening which is closed by a strip of transparent and suitably tinted material 56. The opening 55 being unobstructed, it will be apparent that the light rays passing to the eye of the operator will not be modified or tinted as a consequence of use of the filter. However, the rays passing to the film will be modified to produce results in accordance with the characteristics of the filter which is being employed. As a result of this construction, the effectiveness of the visual image passing to the operator is in no wise detracted from. As will also be seen, the slot or guiding structure which accommodates the filter body preferably extends through at least a portion of the gate structure as shown especially in Figs. 3 and 6. This is desirable from the viewpoint of mounting the filter strip but need not necessarily be resorted to so long as the filter comes to properly lie to the rear of the shutter.

Now with a view to providing a mechanism which will feed the film through the camera and past the framing aperture 48, attention is primarily directed to Figs. 3 and 6. In the latter of these figures, it will be seen that the shaft 57 which mounts the gear 29 has secured to its inner end a member 58 formed with a cam track 59. Bearing within the latter is a follower or pin 60 which, in order to reduce unnecessary friction, may be in the form of a roller. This pin is mounted upon an arm 61 which is slidably supported by a pin 62 and by suitable engagement with a bearing encircling the shaft 57. Attached to arm 61 as, for example, by a pivot 64 is an arm 63. This arm, adjacent its end, terminates in a film-engaging portion 65. The arm is swung around on pivot 64 by means of a connecting element 66 carried by the member 58 and extending through a slot 67 in the arm 63. It will also be noted that the end portion 65 conveniently projects into the groove and slot 53 formed in the plate 51 and block 52.

As a consequence of this construction, it is obvious that, with the film in proper position, the portion 65 may be introduced into one of the feed apertures thereof. Thereupon, with the shaft 57 rotating, the arm 63 will have imparted to its end portion 65 a film feeding movement. This feeding will obviously occur as a consequence of engagement of the arm portion 65 with the edge of the film sprocket perforation. Thereupon, the arm 63 will be retracted or moved to the left as viewed in Figs. 3 and 6. This will withdraw the extended portion 65 out of engagement with the film. Such movement of the parts will occur as a consequence of the roller or follower 60 shifting the arm 61 which is coupled to the arm 63.

The latter will now again be shifted to a point in line with the next sprocket perforation of the film and which defines the beginning of the succeeding frame thereof which is to be exposed. When this position has been assumed by the parts, arm 61 will be moved to the right as viewed in the figures mentioned, resulting in the projection of arm portion 65 into the sprocket perforation of the film. Thereupon, the entire cycle of operation will be repeated. Obviously, such repetition will result in an intermittent feeding of the film in accordance with well-known technique.

Now returning to a consideration of the magazine structure, the coupling of the same by means of the dovetail construction 20 and locking pin or bolt 21 has heretofore been described. It will also be appreciated that, as the magazine is slid into position, the teeth of gear 32 mounted thereby will automatically mesh with the teeth of gear 31. Gears 68 driven by gear 32 are mounted upon shafts 69 supporting rollers 70 having projections or teeth 71 to engage with the feed perforations of the film.

Within the case 11, reels 72 and 73 are mounted. The former provides a film-supply reel while the latter furnishes the take-up reel for the exposed film. A drive pulley 74 may be coupled to the shaft of reel 73 and be actuated by a belt 75 passing around a pulley 76 secured to the corresponding shaft 69. This belt is maintained in taut condition by means of a follower 77 which may be pivotally mounted as at 78 and urged into contact with the belt by means of a spring 79.

An indicator 80 may be visible from the exterior of the magazine casing and cooperate with a scale to indicate the footage which remains on the part of the unexposed film. This indicator may be—as shown—spring pressed and coupled to a roller 81 within the magazine and which roller bears against the body of the film upon reel 72. A catch member or fastening device may be provided on that side of the magazine casing which is opposite to that shown in Fig. 1 and by means of which ready access may be had to the interior of the casing for removing and inserting reels of film. In any event, it will be appreciated that with the disposing of the magazine in operative relation with respect to the camera casing, all parts are coupled so that a rotation of shaft 17 serves to drive the sprockets 70 as well as the reel 73 through the take-up belt 75.

Thus, the camera assembly constructed in accordance with the teachings of the present invention does not require a feed and take-up sprocket built into the camera in order to pull the film to and from the magazine. Also, as especially shown in Fig. 9, that portion of the magazine casing which defines the dovetail 20 and which is disposed in immediate proximity to the gears 68, is formed with slits 82 through which the film may readily be threaded. Between the feed sprockets 70, a block 83 of suitable material may be disposed and which acts as a guide to maintain the film in proper association with the film sprockets. As a consequence of this construction and the fact that the film curves around the sprockets a light trap is furnished which excludes any light from entering the magazine and fogging the film when the magazine casing is disengaged from the camera. Accordingly, velvet and similar material as heretofore used to provide light traps may be completely dispensed with.

In using an apparatus of this nature, it will be understood that the magazine 11 will be primarily loaded with film. A loop of this film may be left extending between the feed sprockets 70 and so that after the magazine is in applied position this loop may be introduced into the space between the gate and maintaining structure 49 after which the latter is secured by the catch 50 or its equivalent. Assuming that the motor or other driving power for rotating the shaft 17 is in position, the latter may now be driven to turn a suitable number of times and to assure that unexposed film is in line with the aperture 48.

The operator may now look through the eye piece 43 and, assuming that one of the shutter wings is in line with the axis of the lens 37, it is apparent that an image of precisely the field and framing as would pass to the film will appear to the eye of the operator. He may now proceed to focus the camera and otherwise adjust the same in accordance with his wishes. A turning of the shaft 17 may now be effected by, for example, closing the switch 13. This will have the result of causing an operation of the magazine feed, the governor, tachometer and shutter shaft.

With the rotation of the latter shaft and assuming that a standard speed of twenty-four pictures per second is being maintained, the shutter revolves at half speed. This would be 720 R. P. M. In ordinary cameras, the shutter rotates at 1440 R. P. M.; this being necessary because the shutter opening extends from 120° to 180° or more. Accordingly, it revolves one complete revolution for each frame which is exposed. The shutter of the present camera being preferably molded from glass and precision ground to provide a front surface mirror, it is necessary to reduce the tangential stress. To do this, the shutter is revolved at one revolution for each two frames of film. For this reason, the shutter is interrupted at two points which are diametrically opposite each other in order to provide for the passage of light rays to the framing aperture 48.

With the shutter in closed position, i. e. obscuring the passage of light rays to the unexposed film, the images are obviously reflected to the ground glass screen and through to the eye of the operator; this having been previously brought out. Due to the "persistency of vision," the eye of the operator receives a continuous image as the camera operates. This is especially true because, with the proportioning of the parts as shown, the interrupted portions of the shutter comprise approximately 50% only of the aggregate wing portions. Therefore, the viewing period is twice as long as the exposure period. If a plain mirrored surface is employed a very perceptible flicker will predominate and be transmitted to the eye of the operator. However, by having each mirrored blade divided equally by an optical black or a non-reflecting area 39, a much smoother visual image results. These areas may, of course, be provided by painting over the mirrored surface.

When all of the film to be exposed has been run off, it will, of course, be disposed upon reel 73. At that time, the operator may simply discontinue driving of the shaft 17. By simply releasing pin 21, the entire magazine assembly may be detached, such detachment resulting in a disengagement of the gear 32 from the gear 31. Also, if desired, the motor casing 12 may be detached by retracting pin 19 and uncoupling the dovetailed structure.

As shown in Fig. 10, the motor casing 12, when mounted on the side of the camera, may be used as a handle while operating the same. As also brought out in that view, the electric motor may be interchangeably employed in various positions by merely unlocking the quick release clamp lock. Additionally, a detachable spring motor may be employed in place of an electric motor. The handle or casing portion 12 will, under these circumstances, also serve as a gripping element while winding the spring.

The motor may couple directly on to the main cam shaft. When the motor is mounted on the bottom—and as afore brought out—the drive is through the main vertical drive shaft. Under both arrangements, a proper turning of the parts is assured.

As illustrated in Fig. 11, the motor casing extending from the side of the camera casing may be employed as a handle when the latter is mounted by a tripod or its equivalent. Under such conditions, it is apparent that the casing 12 may be readily gripped for the purpose of traversing the objective lens across a given field.

From the foregoing, it will be appreciated that among others the several objects of the invention as specifically afore noted are achieved. Obviously, numerous changes in construction and rearrangements of the parts might be resorted to without departing from the spirit of the invention as defined by the claims.

I claim:

1. A shutter for intercepting the light rays transmitted through the lens of a motion picture camera comprising a plurality of wing portions extending at an angle to the lens axis of the camera, the wing portions being separated by a plurality of gaps, each gap embracing an area substantially less than that of an adjacent wing portion, and each wing portion including a reflective and an opaque non-reflective area, the non-reflective area extending radially across the pertaining wing portion and intermediate its side edges.

2. A shutter for intercepting the light rays transmitted through the lens of a motion picture camera comprising a plurality of wing portions, the wing portions being separated by a plurality of gaps, each gap embracing an area substantially less than that of an adjacent wing portion, and each wing portion including a reflective area extending at an angle to the lens axis of the camera and including an opaque non-reflective area, the non-reflective area extending radially across the pertaining wing portion and intermediate its side edges.

3. A shutter for intercepting the light rays transmitted through the lens of a motion picture camera comprising a plurality of wing portions, the wing portions being separated by a plurality of gaps, each gap embracing an area substantially less than that of an adjacent wing portion, and each wing portion including a reflective area extending at an angle to the lens axis of the camera and including an opaque non-reflective area, the non-reflective area extending radially substantially midway between the edges of the pertaining wing portion.

4. A shutter for intercepting the light rays transmitted through the lens of a motion picture camera comprising a plurality of wing portions, the wing portions being separated by a plurality of gaps and the total area of said wing portions being substantially twice as large as the total area of said gaps, each gap embracing an area substantially less than that of an adjacent wing portion, and the wing portions including reflective areas extending at an angle to the lens axis of the camera and including opaque non-reflective areas, the non-reflective areas extending radially across the pertaining wing portion and intermediate its side edges.

5. A viewing mechanism for motion picture cameras including a rotatably mounted shutter, the shutter having a plurality of wing portions, the wing portions being separated by a plurality of gaps, each gap embracing an area substantially less than that of an adjacent wing portion, and each wing portion including a reflective area extending at an angle to the lens axis of the camera and including an opaque non-reflective area, the non-reflective area extending radially across the pertaining wing portion and intermediate its side edges, a screen member to receive the light image reflected by said reflective areas of said wing portions and means permitting the viewing of the image appearing on said screen member.

J. BURGI CONTNER.

REFERENCES CITED

The following references are of record in the file of this patent:

UNITED STATES PATENTS

| Number | Name | Date |
|---|---|---|
| 2,012,352 | Rusting et al. | Aug. 27, 1935 |
| 2,246,971 | Brenkert | June 24, 1941 |
| 2,023,493 | Stanford | Dec. 10, 1935 |
| 2,275,497 | Berndt | Mar. 10, 1942 |
| 2,205,179 | Schultz | June 18, 1940 |
| 2,178,243 | Sachtleben | Oct. 31, 1939 |
| 1,584,186 | Mitchell | May 11, 1926 |
| 1,626,841 | Kelley et al. | May 3, 1927 |
| 722,382 | Pross | Mar. 10, 1903 |
| 2,032,874 | Gaty | Mar. 3, 1936 |

FOREIGN PATENTS

| Number | Country | Date |
|---|---|---|
| 275,404 | German | June 17, 1914 |
| 137,613 | British | Jan. 22, 1920 |